UNITED STATES PATENT OFFICE 2,487,051

BIOTIN INTERMEDIATE AND HYDROGENATING THIOPHENES

Ralph Mozingo, Elizabeth, Stanton A. Harris, Westfield, Glen E. Arth, Rahway, and Karl Folkers, Plainfield, N. J., assignors to Merck & Co., Inc., Rahway, N. J., a corporation of New Jersey No Drawing. Application December 15, 1945, Serial No. 635,426

16 Claims. (Cl. 260—329)

This invention is concerned generally with novel processes for reducing sulfur containing compounds; more particularly it relates to processes for selectively hydrogenating reducible bonds in compounds containing divalent sulfur without affecting the sulfur linkages. It is further concerned with compounds useful as intermediates in the synthesis of the growth-promoting factor, biotin, and to processes for preparing these intermediates by reduction of unsaturated thiophene derivatives by catalytic hydrogenation.

This is a continuation-in-part of co-pending application Serial No. 554,455, filed Sept. 16, 1944, now Patent 2,487,050.

Biotin is known to be one of the isomers of the chemical compound 2-(4'-carboxy-butyl)-3:4-ureido-tetrahydrothiophene, having the empirical formula $C_{10}H_{16}O_3N_2S$, and the structural formula:

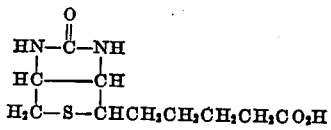

It is now found that this compound can be synthesized by reactions indicated as follows:

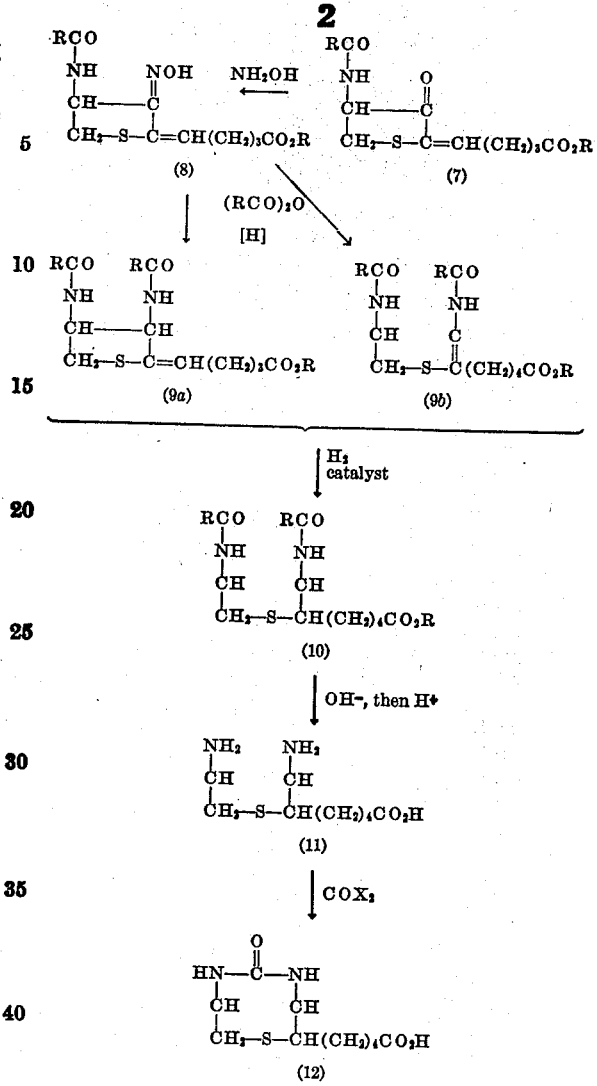

In the above formulae, R represents an alkyl, aryl or arylalkyl group; X, a halogen; and M an alkali metal or an alkaline earth metal.

The reactions above indicated are conducted as follows: 2-amino-3-mercapto-propanoic acid (1) and chloroethanoic acid are condensed in an alkaline aqueous solution to form 2-amino-3-carboxymethyl-mercapto-propanoic acid (2); which is then treated with an acylating agent, such as an acyl halide, in an aqueous alkaline solution to yield 2-acylamido-3-carboxymethylmercapto-propanoic acid (3). This product is esterified using a mineral acid catalyst to produce the diester (4) of the acid (3), and the diester is treated with alkali metal alcoholate or an alkaline earth metal alcoholate to yield the 2-alkali metal or the 2-alkaline earth metal derivative of an ester of 2-carboxy-3-keto-4-acylamido-tetrahydrothiophene (5). This compound, when heated with a dilute mineral acid, is hydrolyzed and decarboxylated to produce 3-keto-4-acylamido-tetrahydrothiophene (6) which, when reacted with 4-carboxybutanal ester in a lower aliphatic alcohol reaction medium containing piperidine and a lower aliphatic carboxylic acid, produces an ester of 2-(4'-carboxybutylidene)-3-keto - 4 - acylamido-tetrahydrothiophene (7). This product, when reacted with hydroxylamine yields an ester of the corresponding oxime, 2-(4'-carboxybutylidene) - 3 - isonitroso-4-acylamido-tetrahydrothiophene (8) which upon treatment with a mixture of zinc, a lower aliphatic acid and a lower aliphatic acid anhydride, produces a mixture of 2-(4'-carboxybutylidene)-3:4-di(acylamido)-tetrahydrothiophene ester (9a) and 2-(4'-carboxybutyl)-3:4-di(acylamido)-4:5-dihydrothiophene ester (9b). This mixture, or if preferred, one of the components, is then treated with hydrogen in the presence of a hydrogenation catalyst to yield 2-(4'-carboxybutyl)-3:4-di(acylamido)-tetrahydrothiophene ester (10). When this last mentioned compound is treated with an aqueous alkaline solution, hydrolysis of the acyl groups occurs, yielding upon acidification, 2-(4'-carboxybutyl)-3:4-diamino-tetrahydrothiophene (11) which when reacted with a carbonyl halide, produces the compound 2-(4'-carboxybutyl)-3:4 -ureido-tetrahydrothiophene. This product is obtained as a mixture of stereoisomers, one of which is racemic biotin, from which upon resolution, is obtained the dextrorotatory isomer, biotin.

This invention is concerned generally with compounds of the class of which intermediate (10) above is a member, the 2-(4'-carboxy-butyl) 3:4-diacylamido tetrahydrothiophenes and esters thereof. It is particularly concerned with a method which is generally applicable for hydrogenating reducible bonds and groups in compounds containing divalent sulfur, which method can be employed for manufacturing compounds useful in the synthesis of biotin. For example, said intermediate (10) is prepared by hydrogenating the intermediate isomeric compounds (9a) and (9b), 2-(4'-carboxy-butylidene)-3:4-diacylamido-tetrahydrothiophene esters and 2-(4'-carboxy-butyl) - 3:4 - diacylamido - 4:5 -dihydrothiophene esters respectively.

Prior to applicants' discovery, it was customary to reduces ulfur-containing compounds by chemical reduction rather than by catalytic hydrogenation due to the catalyst-poisoning effect of reduced or divalent sulfur. Divalent sulfur-containing compounds have been hydrogenated using platinum and palladium but these procedures have resulted in reduction or hydrogenolysis of the sulfur linkage or grouping. Low pressure hydrogenations of sulfur compounds employing nickel catalyst have likewise resulted in hydrogenolysis of the sulfur constituent. In fact, the poisoning effect of divalent sulfur compounds on hydrogenation catalysts is so great, as discussed in "Catalysis" by Berkmann, Morrell and Egloff, Reinhold Pub. Corp. (1940), pages 391–402, that it has been considered impracticable to attempt to catalytically hydrogenate reducible compounds if said compounds contained even traces of divalent sulfur compounds as impurities. For example, in the hydrogenation of benzene, one per cent of thiophene is reported to poison the nickel catalyst.

It is therefore surprising that the catalyst-poisoning effect referred to above can be overcome and that reducible bonds or groupings in a compound which itself contains divalent sulfur can be selectively hydrogenated without affecting the sulfide linkages, by reacting said compound according to applicants' novel process with hydrogen in the presence of a noble metal hydrogenation catalyst. It is presently preferred to carry out the hydrogenation of the sulfur compound at a moderately low hydrogen pressure, although high pressures may be employed if desired. Hydrogenation catalysts which can be employed comprise metals of the platinum group, particularly palladium and/or platinum. It is preferred that the catalyst be distributed upon a suitable carrier such as charcoal, diatomaceous silica, barium sulfate and the like, suspended in a reaction medium. The reaction is best conducted in a liquid medium which is preferably a hydroxylated solvent as for example, water, or an organic solvent such as methanol, ethanol, and the like. Applicants have discovered that the rate of hydrogenation of divalent sulfur compounds and yield of product, is dependent upon the compound being reduced and in particular on the degree to which said sulfur compound poisons the noble metal catalyst. Applicants have discovered however that it is possible to substantially increase the rate of hydrogenation and, most important, to completely overcome the catalyst-poisoning effect by adjusting the quantity and activity of the catalyst, by selection of the solvent, by adjusting the hydrogenation ion concentration and by varying the temperature and pressure at which the reaction is conducted. For example, in the low pressure hydrogenation of a compound such as the biotin intermediate 2-(4' carbomethoxy-butyl)-3-acetamido-4-benzamido-4:5 - dihydrothiophene dissolved in alcoholic hydrochloric acid at a temperature between about 5° and 35° C., it has been found convenient to use approximately 2 to 10 parts by weight of a catalyst containing about 5% palladium for each part by weight of the material to be reduced. Within this catalyst range, the time for the complete reduction of the aforementioned intermediate varies between approximately 20 minutes and 6 hours. It should be emphasized, however, that the proportion of catalyst can be widely varied dependent upon the temperature, the solvent and the time in which it is desired to complete the hydrogenation.

The divalent sulfur compounds which can be hydrogenated of hydrogenolyzed by this method are those which contain reducible groupings. The term "reducible" applies generally to bonds and substituents which can be readily hydrogenated in non-sulfur compounds; these include ring halogen groups; ketone or aldehyde groups and nitrogen substitution products thereof, such as oximes, aryl hydrazones and semicarbazones; nitro groups and intermediate reduction products thereof, such as nitroso, azo and ozoxy; unsaturated carbon-carbon linkages, i. e., olefinic or acetylenic bonds in straight-chain compounds or aliphatic side chains, and ring-carbon-carbon double bonds in cyclic compounds, such as thiophenes, hydrothiophenes and alkylidene substituted tetrahydrothiophenes; and the like.

Among the divalent sulfur compounds which can be hydrogenated according to applicants' process are: substituted dialkyl sulfides; such as p-nitrobenzoyl-methionine, and the like; substituted diaryl sulfides such as 2-nitro-diphenyl sulfide, 2:2'-dinitro-diphenyl sulfide, and the like; thiophene derivatives which include thiophene, halogen substituted thiophenes such as 2-bromothiophene, 2:5-dibromothiophene, alkyl thiophenes such as 2-methylthiophene, 2(4'-carbomethoxy-butyl) thiophene and the like; dihydrothiophenes such as 2(4'-carbomethoxy-butyl)-3-acetamido - 4 - benzamido-4:5-dihydrothiophene, 2 - (4' - carboethoxy-butyl)-3-acetamido-4-benzamido - 4:5 - dihydrothiophene, 2-(4'-carbobenzoxy-butyl)-3-benzamido-4-acetamido-4:5-dihydrothiophene and the like; tetrahydrothiophenes such as 3-keto-tetrahydrothiophene, 2-(4'-carbomethoxy-butylidene)-3-keto-4-benzamido-tetrahydrothiophene, 2-(4'-carbopropoxy-butylidene)-3(p-nitrophenyl-hydrazino)-4-benzamido-tetrahydrothiophene, 2 - (4' - carbomethoxy - butylidene)-3-oximino-4-benzamido - tetrahydrothiophene, 2-(4'-carbobenzoxy-pentylidene)-3-keto-4 - acetamido-tetrahydrothiophene, 2-(4'-carbomethoxy-butylidene)-3-acetamido-4-benzamido-tetrahydrothiophene, 2-(4'-carboethoxy-butylidene)-3-benzamido-4-acetamido-tetrahydrothiophene, 2-(4'-carbophenoxy-propylidene)-3-acetamido-4-benzamido-tetrahydrothiophene and the like. When halogenated thiophene compounds are reacted with hydrogen according to applicants' process, the halogen atom is generally hydrogenolyzed to produce the parent thiophene compound, which, except in the case of thiophenes containing amino substituents, is reduced to the corresponding tetrahydrothiophene derivative. It has been found difficult to hydrogenate ring carbon-carbon double bonds in 3:4-diamino-thiophenes and N-substituted derivatives thereof, such as 3:4-diamino-thiophene, 2-(4'-carbomethoxy-butyl) - 3 - amino-4-benzamido-thiophene, 2-(4'-carbomethoxy-butyl)-3-acetamido-4-benzamido-thiophene, and the like; applicants' preferred process must therefore be modified to convert said thiophene compounds to the corresponding tetrahydrothiophene derivatives. Generally, when a thiophene compound containing groups reducible to amino or substituted amino in the 3- and 4-positions, such as 3:4-dinitrothiophene, is hydrogenated, it is found that the product is the corresponding 3:4-diamino-thiophene. Similarly when a tetrahydrothiophene compound such as 2-(4'-carbomethoxy-butyl) - 3-oximino-4-benzamido - tetrahydrothiophene is hydrogenated according to applicants' preferred process, a simultaneous hydrogenation and dehydrogenation occurs to produce 2-(4'-carbomethoxy-butyl) - 3 - amino - 4 - benzamido-thiophene.

Applicants' novel method can be employed for hydrogenating the isomeric compounds, intermediates (9a) and (9b), above which are represented by the formulae:

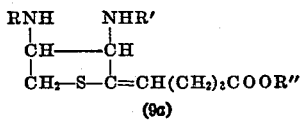

and

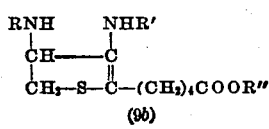

wherein R and R' are acyl groups and R'' is of the class consisting of hydrogen, alkyl, aryl, and aralkyl groups; when R and R' are different aryl groups the product obtained is the desired intermediate (10) above, which is represented by the formula

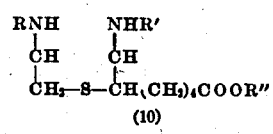

wherein R and R' are different acyl groups and R'' has the significance assigned above.

The above starting materials, the 2-(4'-carboxy-butyl) - 3:4 - diacylamido-4:5-dihydrothiophene and the 2-(4'-carboxy-butylidene)-3:4-diacylamido-4:5-tetrahydrothiophene can be obtained by the reactions indicated above and described in co-pending applications, Serial Nos. 554,458, now Patent 2,466,232, 554,449, 554,450, 554,451, 554,452 now Patent 2,452,653, all filed September 16, 1944; Serial No. 635,427 filed December 15, 1945, now Patent 2,460,225; and 635,428 filed December 15, 1945, now Patent 2,460,226. The product obtained by the process according to this invention can be converted to biotin by the operations indicated above and described in co-pending applications Ser. Nos. 554,456 and 554,457, both filed September 16, 1944, both now abandoned.

When the compound 2-(4'-carbomethoxy-butylidene)-3-acetamido-4-benzamido - tetrahydrothiophene is prepared by synthesis, it is obtained as a mixture of isomers which can be readily separated by fractional crystallization, a first racemate of stereoisomers (M. P. 185–186° C.) consisting of the dextrorotatory and laevorotatory forms of the equilibrant 2-(4'-carbomethoxy-butyl) - 3 - acetamido-4-benzamido-4:5-dihydrothiophene and a second racemate of stereoisomers (M. P. 162–163° C.) consisting of the dextrorotatory and laevorotatory forms of 2-(4'-carbomethoxy - butylidene)-3-acetamido-4-benzamido-tetrahydrothiophene. The first racemate, when subjected to catalytic hydrogenation according to the process according to this invention, yields a pair of racemic mixtures of stereoisomers, one consisting of dl-trans-allo-2-(4'-carbomethoxy-butyl)-3-acetamido-4-benzamido-tetrahydrothiophene (M. P. 172–173° C.) and another dl-cis-2-(4'-carbomethoxy-butyl)-3-acetamido-4-benzamido-tetrahydrothiophene (M. P. 153–4° C.). The second racemate, when subjected to such hydrogenation, also yields a pair of racemic mixtures of stereoisomers, the dl-trans-allo isomer (M. P. 172–173° C.) above mentioned and the dl - trans-epiallo-2-(4'-carbomethoxy-butyl) - 3 - acetamido-4-benzamido-tetrahydrothiophene (M. P. 185–6° C.).

Inasmuch as the catalytic reduction reaction according to this invention is not concerned with the acylamido substituents, it is not material what acyl groups appear on these substituents. Among the acyl groups that can appear at these substituents are acetyl, propanoyl, butanoyl, benzoyl and other acyl groups derived from alkyl carboxylic acids, aryl carboxylic acids and arylalkyl carboxylic acids. It is also immaterial what esters are employed as all are satisfactory, including methyl, ethyl, propyl, butyl, benzyl, phenyl and other alkyl, aryl and arylalkyl esters.

The hydrogenation process according to the present invention can also be employed for hydrogenating compounds represented by the generic formulae:

(13)
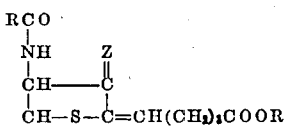

and

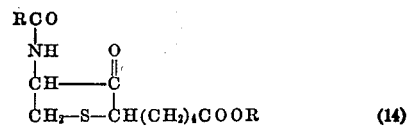     (14)

wherein R represents an alkyl, aryl, or aralkyl group and Z is of the class consisting of keto, oximino, arylhydrazino and semicarbazido, such as:

2 - (4' - carboethoxy - butylidene) - 3 - keto - 4-benzamido-tetrahydrothiophene.

2 - (4' - carbomethoxy - butyl) - 3 - oximino - 4-benzamido-tetrahydrothiophene.

2 - (4' - carbopropoxybutyl) - 3 - (p-nitrophenylhydrazino) - 4 - benzamido - tetrahydrothiophene.

2 - (4' - carbobenzoxy - butylidene) - 3 - keto - 4-benzamido-tetrahydrothiophene.

2 - (4' - carbophenoxybutyl) - 3 - keto - 4 - benzamido-tetrahydrothiophene.

2 - (4' - carboethoxy - butyl) - 3 - keto - 4 - acetamido-tetrahydrothiophene.

2 - (4' - carbomethoxy - butylidene) - 3 - oximino-4-acetamido-tetrahydrothiophene.

2 - (4' - carbopropoxy - butyl) - 3 - (p - nitrophenylhydrazino) - 3 - acetamido - tetrahydro - thiophene.

2 - (4' - carbobenzoxybutyl) - 3 - keto - 4 - acetamido-tetrahydrothiophene.

2 - (4' - carbophenoxy - butylidene) - 3 - keto - 4-acetamido-tetrahydrothiophene.

2 - (4' - carboethoxy - butyl) - 3 - keto - 4 - phenylacetamido-tetrahydrothiophene.

2 - (4' - carbomethoxy - butyl) - 3 - oximino - 4-phenylacetamido-tetrahydrothiophene.

2 - (4' - carbopropoxy - butylidene) - 3 - (p - nitrophenylhydrazino) - 4 - phenylacetamido - tetrahydrothiophene.

2 - (4' - carbobenzoxy - butyl) - 3 - keto - 4 - phenylacetamido-tetrahydrothiophene.

2 - (4' - carbophenoxy - butyl) - 3 - keto - 4 - phenylacetamido-tetrahydrothiophene.

The products obtained by hydrogenating the above compounds can be represented by the following generic formula:

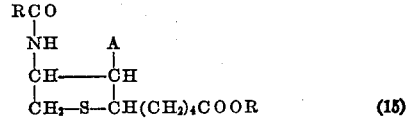     (15)

wherein R represents an alkyl, aryl or aralkyl group and A is selected from the group consisting of hydroxy and amino.

The products represented by the general Formula 15 above can be used for an alternate synthesis of 2-(4'-carboxy-butyl)-3:4-diamino-tetrahydrothiophene, intermediate (11) in column 2. In this alternate synthesis, intermediate (8), the oxime of 2-(4'-carboxy-butylidene)-3-keto-4-benzamido-tetrahydrothiophene ester or the corresponding aryl hydrazone, semicarbazone, or the like which can be represented generically by Formula 16 below, is hydrogenated according to applicants' process to produce the corresponding ester of 2-(4'-carboxy-butyl)-3-amino-4-acyl-amido-tetrahydrothiophene (17); this is then subjected to hydrolysis with an aqueous alkali to produce 2-(4'carboxy-butyl)-3:4-diamino-tetrahydrothiophene (11). The above reactions can be represented as follows:

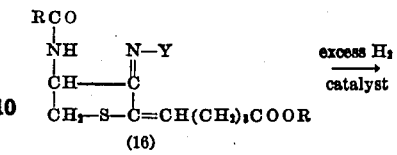
(16)

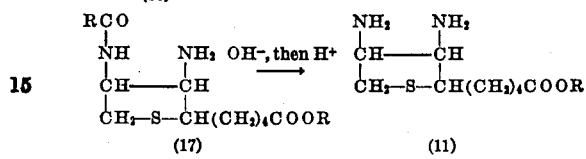
(17)             (11)

In the above formulae, R represents alkyl, aryl, or aralkyl groups and Y—N= is an oximino, arylhydrazino, or semi-carbazido radical.

The 2-(4'-carboxy-butyl)-3-amino-4-benzamido-tetrahydrothiophene ester may also be prepared by reacting intermediate (7), 2-(4'-carboxy - butylidene) - 3 - keto - 4 - benzamido - tetrahydrothiophene ester with hydrogen according to the present invention to produce 2-(4'-carboxy - butyl) - 3 - hydroxy - 4 - benzamido - tetrahydrothiophene ester, then treating this compound with a thionyl or phosphorus halide to replace the 3-hydroxy group by halogen, and reacting the resulting 3-halo compound with ammonia to produce the desired 3-amino derivative (17).

The following examples illustrate methods of carrying out the presently invented process, but it is to be understood that these examples are given by way of illustration and not of limitation.

*Example 1*

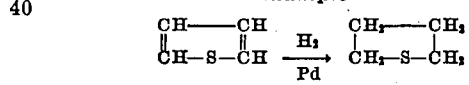

A mixture containing about 0.83 gm. of palladium chloride intimately admixed with about 9.2 gms. of activated charcoal is mixed with 200 cc. of methyl alcohol and reduced with hydrogen at a pressure of approximately 2 to 4 atmospheres. To the reduced catalyst-methyl-alcohol mixture is added about 1.4 cc. of concentrated sulfuric acid and approximately 0.42 gms. of thiophene. The mixture is agitated under a pressure of approximately 2 to 4 atmospheres of hydrogen for approximately 20 to 30 minutes during which time about 2 moles of hydrogen are absorbed. The catalyst is removed by filtration and washed with approximately 20 cc. of methyl alcohol. 2.7 gms. of mercuric chloride is then added to the methyl alcohol filtrate and the mixture is maintained at 45° C. until solution is complete. The resulting solution is then diluted to about 500 cc. with water, and cooled to about 0° C., whereupon long white needles of the mercuric-chloride-addition-product of tetrahydrothiophene crystallize and are filtered and washed with a small amount of water. The crude product is recrystallized from methyl alcohol to produce about 1.2 gms. of pure product; M. P. 129–130° C.

*Example 2*

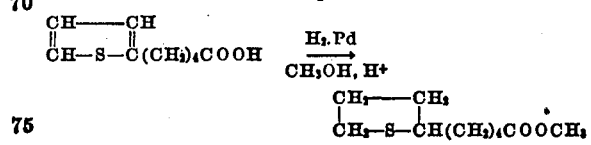

To a catalyst suspension prepared as described in Example 1, containing about 0.5 gm. of palladium metal and about 9.5 gms. of activated charcoal suspended in about 200 cc. of methyl alcohol, is added about 1.3 cc. of concentrated sulfuric acid and about 2.0 gms. of 2-(4'-carboxy-butyl)-thiophene (which can be prepared according to the method described in J. Biol. Chem. 146, 487 (1942)). The mixture is agitated under a pressure of approximately 18 to 40 pounds per square inch of hydrogen for approximately 6 hours, in which time approximately the theoretical quantity of hydrogen is absorbed. The catalyst is removed by filtration and washed with 20 cc. of methyl alcohol. About 5.5 gms. of mercuric chloride is added to the methyl alcohol filtrate and the mixture heated at 40° C. until solution is complete. The resulting solution is diluted to about 500 cc. with water, the solution is cooled and the crystals which form are filtered and recrystallized from methyl alcohol to produce approximately 3 gms. of the pure mercuric-chloride-addition-product of 2-(4'-carbomethoxy-butyl) tetrahydrothiophene; M. P. 85–86° C.

*Example 3*

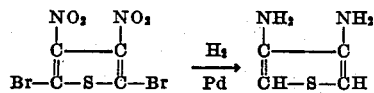

2,5-dibromo-3:4-dinitrothiophene can be prepared from thiophene as described in Ber. 16, 1469 (1883) and Ber. 17, 2074 (1884). To a catalyst suspension prepared as described in Example 1 containing about 1.5 gms. of palladium metal and 28.5 gms. of activated charcoal, suspended in about 600 cc. of 50% aqueous methyl alcohol, is added about 7.5 cc. of concentrated sulfuric acid and about 10 gms. of pure 2:5-dibromo-3:4-dinitrothiophene (M. P. 134–135° C.). The mixture is agitated under a hydrogen pressure of approximately 20 pounds per square inch of hydrogen for approximately 1½ hours, after which time hydrogen absorption is quite slow. The catalyst is removed by filtration and washed with approximately 200 cc. of 50% aqueous methyl alcohol. The aqueous methyl alcohol solutions are then concentrated under reduced pressure to about 200 to 300 cc. to remove substantially all of the methyl alcohol. The resulting 3:4-diaminothiophene in aqueous acid solution is identified by conversion to its diacetyl and dibenzoyl derivatives, and by conversion to 3,4-ureidothiophene as follows:

The water solution of the diamine obtained by hydrogenation of 30 gms. of 2:5-dibromo-3:4-dinitrothiophene is treated with 105 gms. of sodium bicarbonate and 60 cc. of acetic anhydride. The crude product which crystallizes is filtered and recrystallized from acetone to produce pure 3:4-diacetamidothiophene; M. P. 207–208° C.

The water solution of the diamine obtained by hydrogenation of 10 gms. of 2:5-dibromo-3:4-dinitrothiophene is covered with a layer of ether and about 15 cc. of benzoyl chloride added. The solution is made slightly alkaline with 30% sodium hydroxide, which is added portion-wise from time to time so that only a slight excess remains in the aqueous layer. When the benzoyl chloride has all disappeared, the solid material which precipitates is filtered and recrystallized from actone to produce pure 3:4-dibenzamidothiophene; M. P. 268–269° C.

The water solution of the diamine obtained by hydrogenation of 1.7 gms. of 2:5-dibrom-3:4-dinitrothiophene is treated with sodium carbonate and phosgene. The water solution is evaporated to dryness under reduced pressure and the residual product extracted with methanol. The methanol extract is then evaporated to dryness under reduced pressure and the residual product sublimed at 125–150° C. ($10^{-6}$ mm.). The sublimate is recrystallized from methyl alcohol-ether solution to produce pure 3:4-ureido-thiophene; M. P. 200° C.

*Example 4*

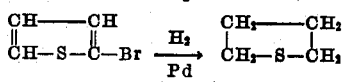

A mixture containing about 1.7 gms. of palladium chloride intimately admixed with about 18 gms. of activated charcoal is mixed with 200 cc. methyl alcohol and reduced with hydrogen at a pressure of approximately 2 to 4 atmospheres. To the reduced catalyst-alcohol mixture is added 1.63 gms. of 2-bromothiophene and the mixture is agitated under a pressure of approximately 2 to 4 atmospheres for approximately 4 to 5 hours, during which time about 3 equivalents of hydrogen are absorbed. The catalyst is removed by filtration and washed with approximately 20 cc. methyl alcohol. 4.0 gms. of mercuric chloride are then added to the methyl alcohol filtrate and the mixture is allowed to stand until solution is complete. The resulting solution is then diluted to about 500 cc. volume with water, and cooled to about 0° C., whereupon long white needles of mercuric chloride addition product of tetrahydrothiophene crystallize and are filtered and washed with a small amount of water. The crude product is recrystallized from methyl alcohol to produce about 2.0 gms. of pure product; M. P. 129–130° C.

*Example 5*

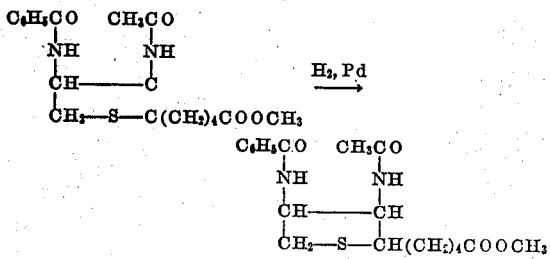

About 1.1 g. of dl-2-(4'-carbomethoxy-butyl)-3-acetamido - 4 - benzamido-4:5-dihydro - thiophene (M. P. 185–186° C.) is added to a suspension of about 7 g. of palladinized (about 5%) activated charcoal, previously reduced with hydrogen, in about 126 cc. of methanol and hydrogen is passed into the mixture at room temperature. After absorption of the calculated quantity of hydrogen which usually requires about 20 minutes, the catalyst is removed by filtration and extracted with hot methanol. The extract is evaporated under reduced pressure to yield crude dl-trans-allo-2-(4'-carbomethoxy-butyl)-3-acetamido-4-benzamido - tetrahydrothiophene which when recrystallized from methanol yields the pure product (M. P. 171–172° C.) When this product is saponified by heating with aqueous-alcoholic alkali followed by acidification of the reaction mixture, the corresponding acid, dl-trans-allo - 2-(4'-carboxy-butyl)-3-acetamido-4-benzamido-tetrahydrothiophene (M. P. 195° C.) is obtained.

*Example 6*

The operations described in Example 5 are repeated but after the hydrogenation step the catalyst is removed, extracted with chloroform, the extract is evaporated to dryness, and the residue is crystallized from ether to yield the product dl - cis - 2 - (4' - carbomethoxy - butyl) - 3 - acetamido - 4 - benzamido - tetrahydrothiophene (M. P. 153–154° C.). When this product is saponified and acidified as in Example 1, the corresponding dl-cis-acid (M. P. 232° C.) is obtained.

Example 7

The operations described in example 6 are repeated using dl - 2 - (4' - carbomethoxy - butylidene) - 3 - acetamido - 4 - benzamido - tetrahydrothiophene (M. P. 162–163° C.) instead of the starting material therein indicated. The product obtained is dl-trans-epiallo-2-(4'-carbomethoxy - butyl) - 3 - acetamido - 4 - benzamido - tetrahydrothiophene (M. P. 185–186° C.).

Example 8

The operations described in Example 5 are repeated using a palladium-barium carbonate catalyst instead of a palladium charcoal catalyst. The product (M. P. 171–172° C.) is identical with that obtained as described in Example 1. Evaporation of the methanol filtrate yields the dl-cis-isomer (M. P. 153–4° C.).

Example 9

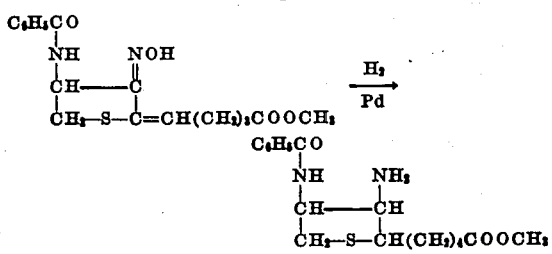

About 0.12 gm. of 2 - (4' - carbomethoxy - butylidene) - 3 - oximino - 4 - benzamido - tetrahydrothiophene, which can be prepared as described in co-pending application Ser. No. 554,453, is dissolved in 200 cc. of methanol in which is suspended about 15 grams of a palladium-charcoal catalyst (containing approximately 5% palladium) and the mixture hydrogenated for about 2 to 3 hours under an initial hydrogen pressure of 40 pounds per square inch. The catalyst is then removed by filtration and eluted with chloroform and then with ammonia. The clear filtrate is evaporated to dryness to produce crude 2-(4'-carbo - methoxy - butyl) - 3 - amino - 4 - benzamido - tetrahydrothiophene.

This can be identified by hydrolyzing the crude product with aqueous barium hydroxide and reacting the hydrolyzed product with phosgene, whereby a product containing a substantial amount of physiologically active biotin is obtained. Alternatively the crude 2 - (4' - carbomethoxy - butyl) - 3 - amino - 4 - benzamido tetrahydrothiophene is dissolved in about 5 to 10 parts acetic anhydride and the solution evaporated to dryness under diminished pressure. The residue is then suspended in water at 50° C. to decompose the residual acetic anhydride. It is then filtered, dried, and the mixture of stereoisomeric racemates redissolved in a minimum quantity of hot methanol; upon cooling the methanol solution, a crystalline product separates, which upon recrystallization from ether, yields pure dl - cis - 2 - (4' - carbomethoxy - 3 - acetamido - 4 - benzamido - tetrahydrothiophene (M. P. 153–154° C.).

Example 10

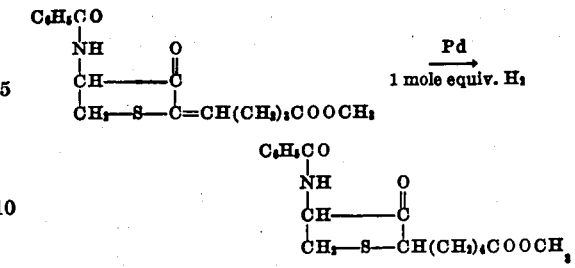

About 1.7 gms. of 2 - (4' - carbomethoxy - butylidene) - 3 - keto - 4 - benzamido - tetrahydrothiophene which can be prepared as described in co-pending application Ser. No. 554,452, is dissolved in about 200 ml. of methanol, in which is suspended the palladium-charcoal catalyst obtained by previously reducing about 10 gms. of a charcoal-palladium chloride mixture containing 5% of the palladium chloride by weight. This mixture is then shaken with hydrogen at 40 pounds per square inch pressure until 1 mole equivalent has been absorbed. This takes approximately four hours. The slurry is then filtered and the catalyst washed thoroughly with methanol; the methanol solution is then evaporated and the concentrated solution cooled and the crystals which form are filtered and dried to produce substantially pure 2 - (4' - carbomethoxy - butyl) - 3 - keto - 4 - benzamido - tetrahydrothiophene; M. P. 114–116° C.

Example 11

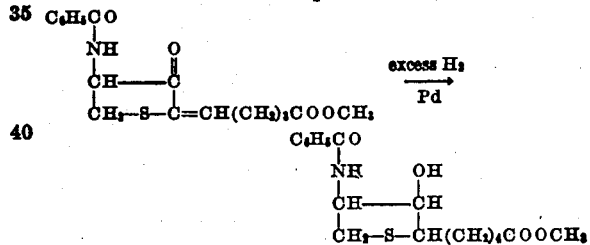

The operation described in Example 10 is repeated but the hydrogenation is continued until two moles equivalent of hydrogen have been absorbed. When the methyl alcohol solution, after the removal of the catalyst by filtration, is evaporated to dryness, there is obtained a mixture of the isomeric 2 - (4' - carbomethoxy - butyl)-3-hydroxy - 4 - benzamido - tetrahydrothiophenes.

Three of the four possible pairs of stereoisomers are isolated and characterized as follows:

(1) The mixture of the isomeric carbinol compounds obtained above is redissolved in alcohol, the alcohol solution partially evaporated, the concentrated solution cooled and the crystals which separate are filtered and recrystallized from a mixture of benzene and ethyl ether to produce one of the stereoisomeric racemates of 2 - (4' - carbomethoxy - butyl) - 3 - hydroxy - 4 - benzamido - tetrahydrothiophene; M. P. 127–128° C.

(2) The mother liquor obtained after filtering off the above stereoisomer is subjected to further evaporation and the concentrated solution again cooled and allowed to stand until crystals form (several days). The crystals thus obtained consist of two types: cubic crystals and needles; these crystals are filtered and the cubic crystals and needles separated mechanically. The cubic crystals are recrystallized from methanol to produce a second pure stereoisomeric racemate of 2 - (4' - carbomethoxy - butyl) - 3 - hydroxy - 4 - benzamido - tetrahydrothiophene; M. P. 118–119° C.

(3) The needles described above comprise crude 2-(4'-carbomethoxy-butyl)-3-keto-4-benzamido-tetrahydrothiophene mixed with a third of the stereoisomeric carbinols. These needles are dissolved in ether and allowed to stand at room temperature in an open vessel. Evaporation and crystallization occur concurrently and the ether solution is decanted from the crystals obtained; these crystals are then recrystallized from methanol to produce a third substantially pure stereoisomeric racemate of 2-(4'-carbomethoxy-butyl)-3-keto-4-benzamido-tetrahydrothiophene; M. P. 136–138° C.

These stereoisomeric carbinols may be converted to the corresponding 2-(4'-carbomethoxy-butyl)-3-amino - 4 - benzamido-tetrahydrothiophene by first treating the carbinol with a phosphorus or thionyl halide in order to convert the 3-hydroxyl group to a 3-halo group and then reacting the intermediate 2-(4'-carbomethoxy-butyl)-3-halo-4-benzamido-tetrahydrothiophene with ammonia.

*Example 12*

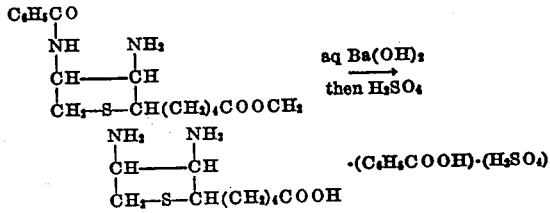

The 2-(4'-carbomethoxy - butyl)-3-amino-4-benzamido-tetrahydrothiophene is converted to the corresponding 3:4 diamino compound, precursor of biotin, as follows: About 1 gm. of 2-(4'-carbomethoxy-butyl)-3-amino-4-benzamido-tetrahydrothiophene (as prepared in Example 9 or 11) is heated in a closed vessel with an aqueous solution containing about 10 gms. of barium hydroxide dissolved in approximately 55 cc. of water for about 16 hours at 140° C. and the mixture is then allowed to cool to room temperature and is acidified with sulfuric acid. The precipitated barium sulphate is removed by filtration and the filtrate is concentrated to about 8 cc. and cooled, whereupon the benzoic acid sulfate complex of dl-cis-2-(4'-carbomethoxy - butyl)-3:4-diamino-tetrahydrothiophene; (M. P. 249–250° C.) crystallizes and is recovered by filtration.

Modifications may be made in carrying out the present invention without departing from the spirit and scope thereof and the invention is to be limited only by the appended claims.

We claim:
1. The process which comprises reacting 2-(4'-carbomethoxy - butylidene)-3-keto-4-benzamido-tetrahydrothiophene with one molecular equivalent of hydrogen in the presence of palladium to produce 2-(4'-carbomethoxy - butyl)-3-keto-4-benzamido-tetrahydrothiophene.

2. The process which comprises reacting 2-(4'-carbomethoxy - butyl)-3-keto-4-benzamido - tetrahydrothiophene with hydrogen in the presence of palladium to produce 2-(4'-carbomethoxy-butyl)-3-hydroxy-4-benzamido - tetrahydrothiophene.

3. The process which comprises reacting 2-(4'-carbomethoxy-butylidene)-3-oximino - 4 - benzamido-tetrahydrothiophene with hydrogen in the presence of palladium catalyst to produce 2-(4'-carbomethoxy-butyl)-3-amino - 4 - benzamido-tetrahydrothiophene.

4. 2-(4'-carboalkoxy - butyl)-3-amino-4-benzamido-tetrahydrothiophene.

5. The process for hydrogenating reducible bonds in thioethers without affecting the sulfur linkages, which comprises reacting hydrogen with a thioether selected from the class which consists of thiophene, substituted dihydrothiophenes, and substituted thiophene and tetrahydrothiophene compounds containing at least one unsaturated non-aromatic substituent, said reaction being carried out in the presence of a metal of the platinum group.

6. The process for hydrogenating reducible bonds in thioethers without affecting the sulfur linkages, which comprises reacting hydrogen with a thioether selected from the class which consists of thiophene, substituted dihydrothiophenes, and substituted thiophene and tetrahydrothiophene compounds containing at least one unsaturated non-aromatic substituent, said reaction being carried out in the presence of palladium.

7. The process for hydrogenating reducible bonds in thioethers without affecting the sulfur linkages, which comprises reacting hydrogen with a substituted dihydrothiophene compound, said reaction being carried out in the presence of palladium.

8. The process for hydrogenating reducible bonds in thioethers without affecting the sulfur linkages, which comprises reacting hydrogen with a substituted tetrahydrothiophene compound containing at least one unsaturated non-aromatic substituent, said reaction being carried out in the presence of palladium.

9. The process for hydrogenating reducible bonds in thioethers without affecting the sulfur linkages, which comprises reacting hydrogen with a 2-substituted di-(acylamido)-dihydrothiophene compound in which the substituent in the 2-position is an omega-substituted alkyl radical, said reaction being carried out in the presence of palladium.

10. The process for hydrogenating reducible bonds in thioethers without affecting the sulfur linkages, which comprises reacting hydrogen with a 2-substituted acylamido-tetrahydrothiophene compound in which the substituent in the 2-position is an omega-substituted alkylidene radical, said reaction being carried out in the presence of palladium.

11. The process for hydrogenating reducible bonds in thioethers without affecting the sulfur linkages, which comprises reacting hydrogen with a 2-substituted acylamido-tetrahydrothiophene compound having at least one unsaturated non-aromatic substituent and in which the substituent in the 2-position is an omega substituted alkyl radical, said reaction being carried out in the presence of palladium.

12. The process for hydrogenating reducible bonds in thioethers without affecting the sulfur linkages, which comprises reacting hydrogen with a 2-(4'-carboalkoxy-butylidene)-3-keto-4-acylamido-tetrahydrothiophene, said reaction being carried out in the presence of palladium.

13. The process for hydrogenating reducible bonds in thioethers without affecting the sulfur linkages, which comprises reacting hydrogen with a 2-(4'-carboalkoxy-butyl)-3-keto-4-acylamido-tetrahydrothiophene, said reaction being carried out in the presence of palladium.

14. The process for hydrogenating reducible bonds in the compound 2-(4'-carbomethoxybutylidene)-3-keto-4-benzamido-tetrahydrothiophene without affecting the sulfur linkages, which comprises reacting said compound with hydrogen in the presence of palladium.

15. The process for hydrogenating reducible bonds in thioethers without affecting the sulfur linkages, which comprises reacting hydrogen with a 2-(4'-carboalkoxy-butylidene) - 3 - oximino-4-acylamido-tetrahydrothiophene, said reaction being carried out in the presence of palladium.

16. 2-(4'-carbomethoxy - butyl) - 3 - amino-4-benzamido-tetrahydrothiophene.

RALPH MOZINGO.
STANTON A. HARRIS.
GLEN E. ARTH.
KARL FOLKERS.

REFERENCES CITED

The following references are of record in the file of this patent:

UNITED STATES PATENTS

| Number | Name | Date |
| --- | --- | --- |
| 2,402,614 | Farlow | June 25, 1946 |

Certificate of Correction

Patent No. 2,487,051                                   November 8, 1949

RALPH MOZINGO ET AL.

It is hereby certified that errors appear in the printed specification of the above numbered patent requiring correction as follows:

Column 2, lines 12 and 13, formula (9b), for $$\overset{|}{\underset{OH}{C}} \ \overset{|}{C} \quad \text{read} \quad \overset{|}{\underset{OH}{C}}-\overset{|}{C}$$

lines 22 and 23, formula (10), lines 30 and 31, formula (11), and lines 39 and 40, formula (12), for that portion of each formula reading $$\overset{|}{\underset{OH}{C}} \ \overset{|}{\underset{OH}{C}} \quad \text{read} \quad \overset{|}{\underset{OH}{C}}-\overset{|}{\underset{OH}{C}}$$

column 3, line 58, for "reduces ulfur-containing" read *reduce sulphur-containing*; column 4, line 38, for "hydrogenation" read *hydrogen*; line 67, for "ozoxy" read *azoxy*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*